US009350954B2

(12) United States Patent
Wagreich

(10) Patent No.: US 9,350,954 B2
(45) Date of Patent: May 24, 2016

(54) IMAGE MONITORING AND DISPLAY FROM UNMANNED VEHICLE

(71) Applicant: CRANE-COHASSET HOLDINGS, LLC, Encino, CA (US)

(72) Inventor: David Wagreich, Los Angeles, CA (US)

(73) Assignee: CRANE-COHASSET HOLDINGS, LLC, Woodland Hills, CA (US)

( * ) Notice: Subject to any disclaimer, the term of this patent is extended or adjusted under 35 U.S.C. 154(b) by 400 days.

(21) Appl. No.: 13/847,161

(22) Filed: Mar. 19, 2013

(65) Prior Publication Data

US 2014/0327770 A1 Nov. 6, 2014

Related U.S. Application Data

(60) Provisional application No. 61/685,539, filed on Mar. 20, 2012.

(51) Int. Cl.
| H04N 7/00 | (2011.01) |
| H04N 7/18 | (2006.01) |
| G05B 1/00 | (2006.01) |
| B64C 39/02 | (2006.01) |
| H04N 5/232 | (2006.01) |

(Continued)

(52) U.S. Cl.
CPC .............. *H04N 7/183* (2013.01); *B64C 39/024* (2013.01); *B64C 39/028* (2013.01); *B64D 47/08* (2013.01); *G05D 1/0038* (2013.01); *H04N 5/23238* (2013.01); *H04N 5/23293* (2013.01); *H04N 7/181* (2013.01); *H04N 7/185* (2013.01); *B64C 2201/123* (2013.01); *B64C 2201/127* (2013.01)

(58) Field of Classification Search
CPC ....... H04N 7/185; H04N 7/181; B64D 47/08; G05D 1/0038; B64C 39/024; B64C 39/028; B64C 2201/123; B64C 2201/127
USPC .......................... 348/114, 117, 115, 144, 159
See application file for complete search history.

(56) References Cited

U.S. PATENT DOCUMENTS 4,355,328 A * 10/1982 Kulik ............................... 348/38
4,772,942 A *  9/1988 Tuck ............................... 348/38
(Continued)

FOREIGN PATENT DOCUMENTS

EP          2828148        6/2015
WO      2011/034645 A1    3/2011
(Continued)

OTHER PUBLICATIONS

U.S. Appl. No. 14/036,669, filed Sep. 25, 2013, Non-Final Office Action mailed Sep. 9, 2015, 62 pages.
(Continued)

*Primary Examiner* — John Villecco
(74) *Attorney, Agent, or Firm* — Kilpatrick Townsend & Stockton, LLP

(57) ABSTRACT

An image capture and display system comprises an image capture array positioned on a vehicle, the image capture array comprising a plurality of image sensing members. At least one transmitter is provided for transmitting images from the image sensing members. The system also includes a monitor display array positioned remotely from the image capture array. The monitor display array comprises a display monitor for and corresponding to each image sensing member, and a receiver for receiving the images corresponding to each transmitter.

23 Claims, 10 Drawing Sheets

(51) Int. Cl.
 *B64D 47/08* (2006.01)
 *G05D 1/00* (2006.01)

(56) References Cited

U.S. PATENT DOCUMENTS

| | | | |
|---|---|---|---|
| 5,034,759 A | 7/1991 | Watson | |
| 5,103,306 A | 4/1992 | Weiman et al. | |
| 5,130,794 A | 7/1992 | Ritchey | |
| 5,240,207 A | 8/1993 | Eiband et al. | |
| 6,304,290 B1* | 10/2001 | Bailly | 348/119 |
| 6,781,606 B2* | 8/2004 | Jouppi | G06T 3/4038 318/568.12 |
| 8,903,568 B1* | 12/2014 | Wang | B64C 19/00 244/189 |
| 9,185,290 B1* | 11/2015 | Lapstun | H04N 5/23238 |
| 9,213,333 B2* | 12/2015 | Harrison | G05D 1/0038 |
| 2002/0196339 A1 | 12/2002 | Heafitz | |
| 2004/0066449 A1 | 4/2004 | Givon | |
| 2006/0077255 A1* | 4/2006 | Cheng | G06K 9/0063 348/143 |
| 2006/0083501 A1* | 4/2006 | Segal | A63H 27/12 396/7 |
| 2006/0146132 A1* | 7/2006 | Mayerson | 348/143 |
| 2006/0200382 A1 | 9/2006 | Arutunian et al. | |
| 2007/0088709 A1 | 4/2007 | Bailey et al. | |
| 2007/0096446 A1 | 5/2007 | Breed | |
| 2007/0097206 A1* | 5/2007 | Houvener et al. | 348/26 |
| 2007/0268155 A1 | 11/2007 | Holmes et al. | |
| 2008/0043020 A1 | 2/2008 | Snow et al. | |
| 2008/0158256 A1* | 7/2008 | Russell | G06T 7/0026 345/629 |
| 2009/0015674 A1* | 1/2009 | Alley et al. | 348/144 |
| 2009/0045290 A1 | 2/2009 | Small et al. | |
| 2009/0195652 A1 | 8/2009 | Gal | |
| 2009/0232415 A1 | 9/2009 | Uyttendaele et al. | |
| 2009/0284644 A1* | 11/2009 | McKaughan | G01C 3/08 348/348 |
| 2010/0013923 A1* | 1/2010 | Yakura | 348/143 |
| 2010/0302359 A1* | 12/2010 | Adams et al. | 348/117 |
| 2010/0329542 A1 | 12/2010 | Ramalingam et al. | |
| 2011/0064312 A1 | 3/2011 | Janky et al. | |
| 2011/0134209 A1* | 6/2011 | Schmidt | 348/38 |
| 2011/0134249 A1* | 6/2011 | Wood | G01C 3/08 348/164 |
| 2011/0169945 A1 | 7/2011 | Petrini et al. | |
| 2011/0184647 A1* | 7/2011 | Yoel | G08G 5/0021 701/301 |
| 2011/0249100 A1* | 10/2011 | Jayaram | H04N 5/2253 348/48 |
| 2011/0291918 A1 | 12/2011 | Surber et al. | |
| 2012/0033851 A1 | 2/2012 | Chen et al. | |
| 2012/0229596 A1* | 9/2012 | Rose et al. | 348/36 |
| 2013/0222590 A1* | 8/2013 | O'Brien | 348/148 |
| 2014/0327733 A1* | 11/2014 | Wagreich | 348/37 |
| 2015/0367958 A1* | 12/2015 | Lapstun | B64D 47/08 348/144 |

FOREIGN PATENT DOCUMENTS

| | | |
|---|---|---|
| WO | 2011/048597 A1 | 4/2011 |
| WO | 2014/007873 A2 | 1/2014 |

OTHER PUBLICATIONS

Supplementary European Search Report for EP13813000 completed Nov. 2, 2015, 6 pages.

* cited by examiner

IMAGE MONITORING AND DISPLAY FROM UNMANNED VEHICLE

CROSS REFERENCE TO RELATED APPLICATIONS

This application claims the benefit of U.S. Provisional Patent Application No. 61/685,539 filed Mar. 20, 2012, the contents of which are incorporated by reference herein in their entirety.

FIELD AND BACKGROUND OF THE INVENTION

This invention relates to an image monitoring and display from a vehicle, typically an unmanned vehicle, but also capable of use on a manned vehicle. More particularly, the invention relates to a system of sensors mounted on a vehicle, whether manned or unmanned, a display system, and transmission and reception mechanisms associated with the sensors and display system respectively whereby images or information captured by the sensors can be viewed on the display system. There may be a single or multiple display systems.

In one preferred form, the invention is for an expanded perspective, wrap-around view, image capture and monitoring system for remote piloting of UAVs (unmanned aerial vehicles).

One significant shortcoming when utilizing a single lens, conventionally configured camera and monitoring device combination for airborne first person view (FPV) orientation and guidance of an unmanned aerial vehicle (UAV) during remote control operations is the limited field of view (FOV) that it offers. When using a single lens, conventionally-configured camera and monitor combination, the relatively narrow perspective that is created may hinder a pilot's ability to ascertain an object's true location and proximity to the UAV due to a lack of ambient visual cues, making accurate attitude and control adjustments more difficult.

In certain instances, a very wide perspective (extreme wide angle) lens can be mounted on the conventionally configured single camera setup to compensate for the limited field of view. The problem with using an extreme wide angle lens is that, because of it's unnaturally exaggerated wide perspective and accompanying increased spherical distortion, objects appear diminished in size and an observer's perception of movement and speed is inaccurate, making the precise maneuvering of the craft difficult. This effect is somewhat analogous to the configuration of the right side view mirror in most automobiles, namely, objects are closer than they appear, with accurate distance determinations therefore difficult to make.

SUMMARY OF THE INVENTION

According to one aspect of the invention, there is provided an image capture and display system comprising: an image capture array positioned on a vehicle, the image capture array comprising a plurality of image sensing members, and at least one transmitter for transmitting images from the image sensing members; and a monitor display array positioned remotely from the image capture array, the monitor display array comprising a display monitor for and corresponding to each image sensing member, and a receiver for receiving the images corresponding to each transmitter.

In one form, the vehicle is an unmanned aerial vehicle, and the monitor display is positioned at a ground based location.

A transmitter may be provided for each of the image sensing members in the image capture array and a receiver corresponding receiver is provided for each of the display monitors in the monitor display array.

In one embodiment, image sensing members of different types are placed in the image capture array so that the system can simultaneously capture images of different conditions.

Preferably, the image capture array comprises a frame member attached to the vehicle configured for mounting of the image sensing members thereon. Further, images from two or more image sensing members may be combined for transmission by a single transmitter, the transmission being received by a receiver capable of separating and reconstructing the images to display them on display monitors to form a substantially continuous visual representation as captured by the image sensing members.

In another embodiment of the invention, the image sensing members comprise a first forward facing camera capturing a first forward field of view and a second rearward facing camera capturing a second rearward field of view; and the monitor display array comprises a first display monitor which is curved and displays the images corresponding to the first forward field of view, and a second display monitor which displays images corresponding to the second rearward field of view. The second display monitor may be curved, smaller than the first display monitor, and located above the first display monitor.

According to another aspect of the invention, there is provided an image capture and display system comprising: an image capture array for positioning on a vehicle, the image capture array comprising a plurality of image sensing members, and at least one transmitter for transmitting images from the image sensing members; and a monitor display array for positioning remotely and comprising a pair of wearable video type goggles having a visual display for and corresponding to the composite image provided by the image sensing member, and a receiver for receiving the images corresponding to each transmitter.

In another aspect of the invention, there is provided a method for the capture and display of images, the method comprising: attaching an image capture array to a vehicle, the image capture array comprising a plurality of image sensing members, and at least one transmitter for transmitting images from the image sensing members; and positioning a monitor display array positioned remotely from the image capture array, the monitor display array comprising a display monitor for and corresponding to each image sensing member, and a receiver for receiving the images corresponding to each transmitter for display on the display monitors.

The expanded perspective, wrap-around view, image capture and monitoring system, which can be in both vertical and horizontal views, for remote piloting of UAVs is intended to counteract the limitations of the traditional single camera and monitor FPV combination for UAVs by providing the pilot or operator thereof with a wider, yet substantially undistorted optical perspective that is more in line with the way a human normally sees the environment that encircles him. By enhancing peripheral vision and affording the pilot or operator (or an individual monitoring the craft's actions if it is being flown autonomously) the ability to see what is surrounding the aircraft in all directions, more accurate control input decisions can be made with vastly improved situational awareness and obstacle avoidance capabilities. The cumulative effect further makes the craft safer and improves capability for aerial surveillance, aerial inspection, aerial mapping, transport and lifting of materiel, aerial photography or videography, and other remotely controlled UAV applications.

The panoramic, wrap-around view can be achieved in a number of ways. These ways would include, but are not limited to, the following:

(1) Utilizing multiple, relatively normal perspective (~55°, for example) cameras or sensors fashioned in a generally circular (or semi-circular) array which capture images or information which are then transmitted to, and then displayed on a corresponding monitoring array that is fashioned in a general circle (or semi-circle).

(2) Utilizing one or more panoramic or surround-view cameras or sensors to create a circular (or semi-circular), curved view, which captures images it information that are then transmitted to, and displayed on a corresponding curved monitoring system.

Version (1): Multiple, Normal-Perspective, Image Capture (camera or sensor) Array.

This version of the device comprises four main stages or components. These are:
(1) an image capturing stage,
(2) a wireless image data transmission stage,
(3) a wireless image data reception stage, and
(4) an image display stage.

The first stage is that of the image capture. To achieve this, multiple motion-picture, image capturing devices, such as cameras or sensors, are arranged, each in succession, in a generally circular or multi-faceted pattern to create an array of cameras or sensors which afford a substantially continuous and contiguous 360° view around the vehicle, which in this embodiment will be considered to be an aircraft. It should be noted that this array can also be created with fewer image capture devices if the application calls for less than a 360° view, or if each image capture device covers a wider view. For instance, multiple cameras could be installed on the front quadrant of the craft creating something like a 180° forward view, with another camera facing the rear creating a 90° rearward view, the cumulative result being a non-contiguous view of 270°. Many different combinations to cover selected areas may be configured within the scope of the present invention.

The structure supporting the array of cameras or sensors can take any number of forms and is, generally, of secondary importance so long as the structure permits cameras to be mounted with the appropriate spacing and offset angle, relative to one another, to facilitate an accurate circular view or other selected of the environment surrounding the aircraft.

The second stage is the wireless signal transmission. The video output feeds from each of the cameras or capturing devices is relayed to multiple transmitters, or alternatively, can be amalgamated by a "combiner" into a matrix which then relays this amalgamated signal to a single transmitter. These transmitters, or the single transmitter when using the amalgamated and matrix feed method, then use one or more of radio frequencies, infrared frequencies, or other electromagnetic transmission frequencies to send a wireless signal to remote receivers, or a single receiver, when using the amalgamated and matrix feed method. These signal transmissions can be either in an analogue or digital format, subject to the requirements of the application.

The third stage is the wireless signal reception. The signal(s) received from the transmitter(s) as described above are captured by multiple receivers, or a single receiver if the amalgamated and matrix feed method is used. These signals are converted into video feeds, and in the case of an amalgamated and matrix feed method, the signal is "uncombined" or decoded, and sent to the display portion of the device.

The fourth stage is the image monitoring. The image monitoring or display stage of this multiple normal-perspective image capture version of the device can be implemented in the following several different ways. Examples of such ways are as follows:

(a) In a first variant, there is an image monitoring station comprising an array of monitors which are configured so that the array generally mimics the layout or configuration of the airborne portion (that is, cameras or sensors) of the expanded perspective, wrap-around view, image capture and monitoring system of the invention. This "station" is preferably comprised of a series of video monitors or displays arranged in succession in a generally circular or multi-faceted pattern around the pilot or operator(s), who may be positioned within or at the center of the circle. The video feed from each of the image capture devices onboard the airborne craft is fed to its corresponding video display in the array, providing the pilot or operator(s) with a contiguous, coherent, remote view of the environment surrounding the unmanned aerial vehicle, or other type of vehicle as the case may be.

As an example, if there are six outwardly facing cameras, arranged at about a 60° offset on the airborne craft, then there would be six monitor displays facing inward, arranged at about the same 60° offset at the monitoring station. The pilot or operator would be situated within the circle (or multi-faceted arrangement), encompassed or surrounded by the array of displays, in a viewing position that that best augments UAV situational awareness and control.

The monitor configuration does not have to be circular, and can be arranged in any configuration that is appropriate to the given application, such, for example only, hexagonal, square, elliptical, or the like.

(b) In the second variant of the image display, a wrap-around monitor with a generally circular (or semi-circular) screen is used to display the feeds from the multiple image capturing devices. The associated images from each of the transmitted video feeds would be displayed one next to the other in the correct order relative to each other in order to create a substantially contiguous "single" image on this curved monitor display.

Additionally, motion picture "stitching" software can optionally be utilized to "join" or make the real time output of the multiple camera feeds appear seamless as if generated by one big panoramic camera, if desired.

(c) In the third variant, the video feeds from the cameras or sensors are viewed using video "immersion" type goggles, or equivalent type goggles, which one or more operators may be wearing. These goggles may be used in conjunction with "head-tracking" or "eye movement tracking" technology where virtual tracking of the visual field is based upon either or both of the operator's head motion or eye movement. The necessity of this tracking technology is due to the fact that these types of goggles often provide a field of view (FOV) that may be narrower or more limited than that which the expanded perspective, wrap-around view system image sensor is capable of providing. Technological developments may allow for goggles that afford a FOV that is wide enough to encompass the complete, expanded perspective image that has been acquired by the image capture portion of the expanded perspective, wrap-around view system. In this event, this type of goggle can be utilized.

Version 2: Panoramic Image Capture (Cameras or Sensors).

The expanded perspective, wrap-around view, image capture and monitoring system of the invention can also be implemented using one or more image capturing devices (such as cameras or sensors) with panoramic lenses to create the desired wrap-around, surround view.

As described above with reference to the multiple normal-perspective image capture array version (version 1), the panoramic image capture version of the expanded perspective, wrap-around view, image capture and monitoring system for remote piloting of UAVs also consists of four main stages or components, as follows:

(1) an image capturing stage,
(2) a wireless image data transmission stage,
(3) a wireless image data reception stage, and
(4) an image display stage.

The first stage is the image capture. The image capture or sensing stage of the panoramic image capture version (version 2) of the device can be implemented in the a number of ways, the following of which are representative examples and are not intended to limit the scope of the invention:

(a) A singular, "wrap-around", 360° panoramic image capture device (i.e. lens, camera or sensor) can be used to create a substantially "seamless" 360°, circular view. Alternatively, a wrap-around, semi-circular view of less than 360° can be implemented as well, depending on the application. For example, the wrap-around view could be 180°, or 270°, or 300°, or some other selected value.

(b) Multiple "wrap-around", panoramic image capture devices (i.e. lenses, cameras or sensors), depending on the application, can be used to create a cumulative wrap-around view of up to 360°. One example of this image capture could be: one panoramic lens and video sensor combination creating a 180° view forward of the aircraft, plus one panoramic lens and video sensor combination creating a 90° view to the rear of the craft, in total creating a cumulative, non-contiguous view of 270°. Other configurations would be within the scope of the invention.

The second stage is the wireless signal transmission. The video output feeds from each of the cameras or capturing devices is relayed to multiple transmitters, or alternatively, can be amalgamated by a "combiner" into a matrix which then relays this amalgamated signal to a single transmitter. These transmitters, or single transmitter when using the matrix feed method, then use radio frequencies, infrared frequencies, or other electromagnetic transmission frequencies to send a wireless signal to remote receivers, or a single receiver, depending on the method in place. These signal transmissions can be either in an analogue or digital format, based on the requirements of the selected application.

The third stage is the wireless signal reception. The signal(s) from the transmitter(s) are captured by multiple receivers, or a single receiver if the amalgamated and matrix method is used. These signals are converted into video feeds, or, in the case of an amalgamated and matrix method, the signal is "uncombined" or decoded, and sent to the display portion of the device.

In this case, as is the situation with any of the other embodiments or versions described herein, there may be a mix of single transmitters and receivers for each image capturing device and its corresponding monitor, used in conjunction with the amalgamated or combined transmitters and receivers. Thus, one or more selected camera or sensor and its paired monitor may each have their own dedicated transmitters and receivers, while two or more of the remaining cameras or sensors and monitors pairs may have amalgamated or combined transmitters or receivers serving multiple such pairs.

The fourth stage is the image monitoring. The image monitoring stage of the panoramic image capture (version 2) of the device can be implemented in the following ways:

(a) In a first variant, one or more wrap-around monitors with generally circular or semi-circular or otherwise curved display surfaces are configured to exhibit the feed or feeds of the image capture portion of the system in the first stage. The layout of these monitors will be configured to emulate to the extent possible or desired the lens and camera (or sensor) arrangement on the airborne component of the craft, creating a viewing perspective that attempts to "mirror" or is representative of the airborne field of view that is being captured on the vehicle.

(b) In a second variant, the video feeds are viewed using video "immersion" type or similar type goggles, which the operator(s) may be wearing in conjunction with "head-tracking" or "eye movement tracking" technology where virtual tracking of the visual field is based upon head motion or eye movement of the operator. The necessity of this tracking technology is due to the fact that these types of goggles often provide a field of view (FOV) that may be narrower or more limited than that which the expanded perspective, wrap-around view system image sensor is capable of providing. Technological developments may allow for goggles that afford a FOV that is wide enough to encompass the complete, panoramic image that has been acquired by the image capture portion of the expanded perspective, wrap-around view system. In such an event, this type of goggle can be utilized.

System Configuration

The airborne, camera or image capture portion of the expanded perspective, wrap-around view, image capture and monitoring system of the invention may be attached to some part or structure of the vehicle being flown, and preferably in a location where the view is largely unobstructed by the craft for unhampered performance in collecting desirable images. The location may be above, below, in front of, behind, or to the side, of the host vehicle, or such other suitable location.

The expanded perspective, wrap-around view, image capture and monitoring system can be installed on any type or configuration of airborne UAV. This would include (but not be limited to) the following types of aircraft: fixed-wing, rotor craft (conventional single blade or multi-rotor), glider, lighter-than-air, rocket, space vehicle, etc. The UAV can be of any size or weight.

The monitoring or display station portion of the expanded perspective, wrap-around view, image capture and monitoring system can be implemented as a fixed, ground-based installation, or it can be carried by or contained within a variety of mobile vehicles. These host mobile vehicles would include (but are not limited to) vehicles that are ground-based, water-based (surface or underwater), airborne, or deployed in space.

The monitoring or display station can also be installed in the airborne craft that is being piloted and which contains the image capturing portion of the system. As an example, the image capture portion of the device can be mounted outside the aircraft, while the monitoring portion is installed inside the same flying craft. This type of configuration would be useful in scenarios such as night operations where the craft is being piloted using thermal (infrared) imaging as opposed to a visible light spectrum camera (or sensors), or when dangerous environmental factors such as high radiation levels necessitate that the pilot or occupants of the craft be shielded from these dangerous elements, which may impact the visibility of the outside conditions from the aircraft.

The expanded perspective, wrap-around view system of the invention can utilize many types of image capturing or sensing devices in its construction. These would include (but not be limited to) normal visual spectrum cameras or sensors, infrared cameras or sensors for night vision and/or heat sensing (useful in the carrying out of fire prevention or search and rescue operations), radiation sensors, pressure sensors, gaseous content or humidity sensors, sonic sensors, EMF spectrometers, to name a few possibilities.

Furthermore, the system can be configured to capture and display a 3D version of the wrap-around view for increased depth perception cues.

The complete system and its operation, from image capture, through transmission, to monitoring, would be designed to accomplish minimal delay or latency throughout the signal chain to give the pilot or operator information in as close to real time as technically feasible.

The apparatus and method of the invention can utilize analogue, digital, channel hopping digital (i.e. COFDM), infrared, or other yet to be developed image capture or transmission technologies, or even a combination of such technologies to achieve optimal performance.

The image displayed on the monitoring portion of the system can be augmented or even replaced by computer generated 3D map imagery linked to a navigational system such as GPS or a Real Time Kinematic System if desired. And although the displayed image may be generated synthetically, the benefits of the wrap-around view would still be present in that it provides the pilot or operator(s) with wide perspective, visual cues and increased situational awareness for accurate control input and craft maneuverability.

For example, if a UAV is being operated in an environment of reduced or even zero visibility, such as in fog or during fire fighting operations where very thick smoke is present, the wrap-around computer generated, augmented view of surrounding terrain or obstacles will allow the pilot or operator the ability to maneuver the craft effectively and safely despite his or her inability to see any clear image using a conventional visual spectrum video feed.

The aircraft borne component (Stages 1 and 2) of the expanded perspective, wrap-around view, image capture and monitoring system installation, in any of its variants, can be implemented with or without gyro stabilization, or other types of stabilization, technology depending on the application and whether stabilization and/or a level horizon is deemed to be advantageous to the application.

In one embodiment, the airborne component (Stages 1 and 2) of the expanded perspective, wrap-around view, image capture and monitoring system installation, in any of its variants, can be placed within a protective housing, chamber or other suitable structure that safeguards and protects the components such as the lenses from weather elements, from shock in the event of a crash, hostile weapons attacks, or if it allows for aerodynamic benefits. Various filters may also be provided on the cameras, and in another embodiment, some or all of the cameras or sensors may be contained in a dedicated housing or container to afford the necessary protection.

Transmission repeaters or signal amplifiers can be added to the system and placed in a location or locations which are considered to improve or boost signal quality or extend the range of the UAV's operational area. As on example only, if a craft is flown on one side of a mountain range, with the pilot or operator's monitoring station situated on the other side of a mountain range in a position that does not facilitate a suitable line-of-sight (LOS) signal transmission, a repeater and/or an amplifying device can be placed at a point of high elevation atop the mountain range to aid in the quality and strength of the signal that is being transmitted and received.

A transmission repeater can also be carried aloft by another aircraft (manned or remotely-controlled), or satellite in addition to or instead of the above situation.

The signal that is being broadcast by the airborne component (Stages 1 and 2 as described above) of the expanded perspective, wrap-around view, image capture and monitoring system can be received and displayed by multiple monitoring or display stations (fixed-installation or mobile) simultaneously. As such, the video feed may be monitored in several locations at the same time, providing information to different operators or entities for use according to specific need. Such locations may be a command center as well as a field unit, so that both may benefit, and use the information, from the live video or other feed.

More than one expanded perspective, wrap-around view, image capture and monitoring system can be mounted on a UAV depending on the application. For instance, one system could work within the visual spectrum for piloting (or other) purposes, while another system could utilize a thermal imaging spectrum for aerial surveillance, fire fighting operations, or search and rescue purposes. Additionally, more than one system can be installed on a UAV for the purpose of operational redundancy in the event that one system fails. Further, different types of system feeds can be transmitted to different monitoring stations depending on the needs of each such monitoring station.

DETAILED DESCRIPTION OF THE INVENTION

Reference is now made to the accompanying drawings which show various embodiments of the invention. The drawings are intended to illustrate some of the embodiments, but certainly not all, which can be configured and constructed in accordance with the invention.

Figure 1:
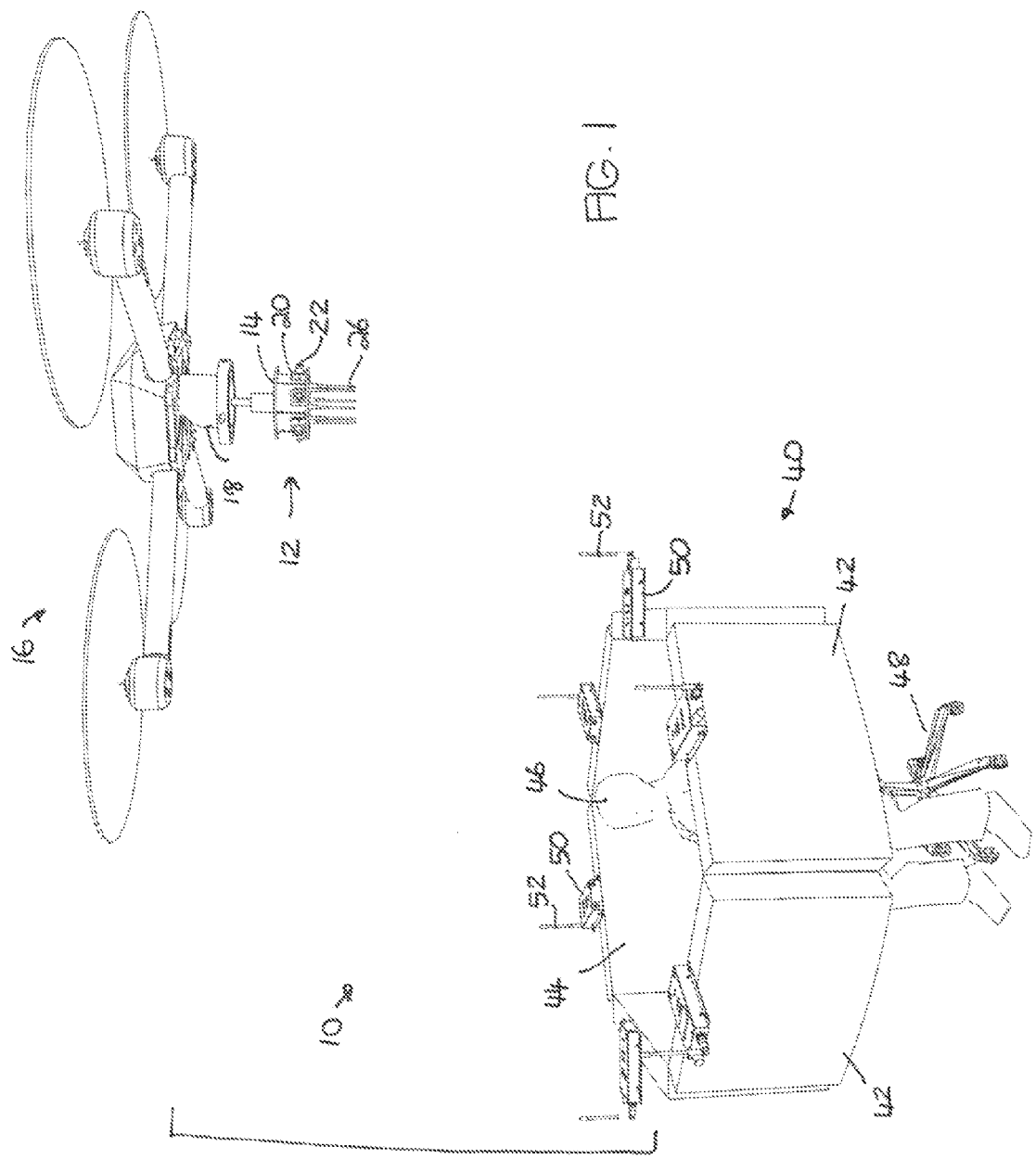
FIG. 1 is a schematic representation of an unmanned aerial vehicle and a monitoring display station in accordance with one aspect of the invention.

FIG. 1 of the drawings illustrates an image monitoring and display system 10 of the invention. It is noted that the monitoring and display is not limited to conventional video in the visual spectrum, but can also utilize infrared, thermal, radiation, or other sensors and display mechanisms. Therefore, any reference herein to visual spectrum image and display should also be understood to encompass all other types of sensing and their respective forms of display.

The monitoring and display system 10 comprises and camera array 12 mounted on a frame 14, which is attached to the underside of an unmanned aerial vehicle 16. One type of aerial vehicle 16 is shown in FIG. 1, but many types may be used. These include manned or unmanned vehicles, fixed wing or rotor craft, gliders, to name a few. The aerial vehicle 16 may optionally include a gyro stabilization device 18 where considered necessary or appropriate.

The camera array 12 comprises six cameras 20 mounted on the frame 14, which may be in the form of a chassis, platform or other suitable structure. The cameras 20 may be exposed, as shown in FIG. 1, but they may also be individually enclosed or enclosed in a containment structure which would make up the frame 14. Each camera or sensor has a lens 22, and each is located on the frame 14 to as to capture a different segment of the surroundings. In the embodiment illustrated, there are six cameras 20 and each would capture images representing six approximately 60 degree segments so that the combined image encapsulates the full 360 degree view about the aerial vehicle 16. The cameras 20 are placed on the frame 14 so that there will preferably be a clear and unimpeded view of the surroundings.

Each camera 20 has associated therewith an antenna 26. In the embodiment of FIG. 1, the antennae 26 are mounted on the lower surface of the frame 14 and project downwardly. Each antenna 26 is directly below its associated camera 20, and is configured to transmit the image from its associated camera 20 to a receiver, as will be described. The antenna arrangement can also take other forms and is not specific to "downward" and "below its associated camera" as described with references to the present embodiment.

The embodiment in FIG. 1 illustrates an antenna 26 for each camera 20 or sensor, but the invention contemplates within its scope fewer antennae 26 than cameras 20. The images from one or more or all of the cameras 20 may be combined and transmitted by a single antenna to a base station where the combined signal will be received and separated into its individual component parts so as to recreate the 360 degree (or other spectrum) view captured by the plurality of the cameras 20.

The invention as illustrated in FIG. 1 of the drawings also has a base monitoring or display station 40. This station 40 comprises six monitors 42 arranged relative to each other to form a generally hexagonal shape, and defining an interior space 44 which can accommodate a pilot or operator 46 and seating 48. The monitors 42 are adjacent or abut each other so as to preferably provide as close to a seamless composite display of the various images captured by the cameras 20.

Each monitor has associated therewith a receiver 50, and each receiver has its own antenna 52. Each antenna 52 of the receivers 50 communicates with one corresponding antenna 26 of the cameras 20, in a manner that will allow the monitors 42 to display the captured images of the cameras 20 in the same order as they are captured by the cameras 20. In this way, a generally 360 degree surround image is assembled and produced on the monitors to display the view much like an operator would have if he or she was actually in the aerial vehicle 16.

It is to be noted that the drawings only show the image capture and monitoring system, but there will also be ground or remote controls to navigate the aerial vehicle (when unmanned) so that it can be directed and flown to the desired location and orientation. Further, each of the lenses 22 on the cameras 20 may be adjustable, either manually or automatically, so that they are directed downwardly to the area to be photographed. Such adjustments may become necessary as the vehicle 16 ascends or descends so that the desired or selected area below continues to be the main focus for the cameras 20.

Figure 2:
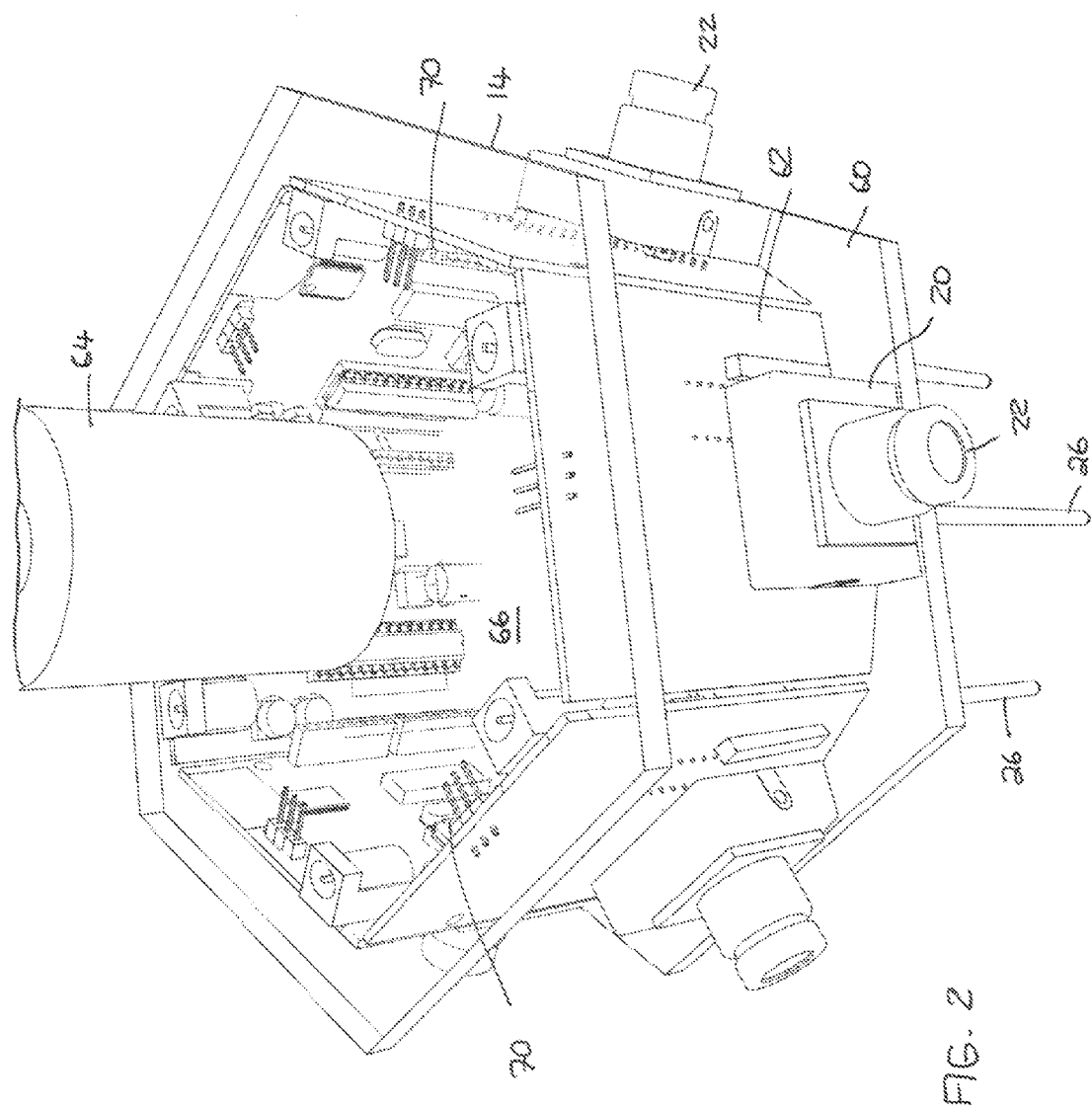
FIG. 2 is perspective view of a camera or sensor arrangement on an unmanned aerial vehicle in accordance with one embodiment of the invention.

Reference is now made to FIG. 2 of the drawings which shows a detail of the camera array 12 mounted on the aerial vehicle 16. The frame 14 is shown as generally comprised of six equal panels 62 arranged in the shape of a hexagon and having an outside lower shelf 60 which supports each camera 20 and lens 22 facing outwardly, each lens 22 being positioned to capture its own approximately 60 degree segment of the surroundings. The frame 14 is fixed to the aerial vehicle 16 by means of an appropriate attachment fitting 64. The frame 14 defines an internal chamber or space 66 designed to house the electronics and other hardware for operating the system, including a transmitter 70 associated with each camera 20 which is connected to its respective antenna 26 located below the shelf 60 to facilitate optimal and unimpeded communication with the antennae 52 on the monitoring station 40.

Figure 3:
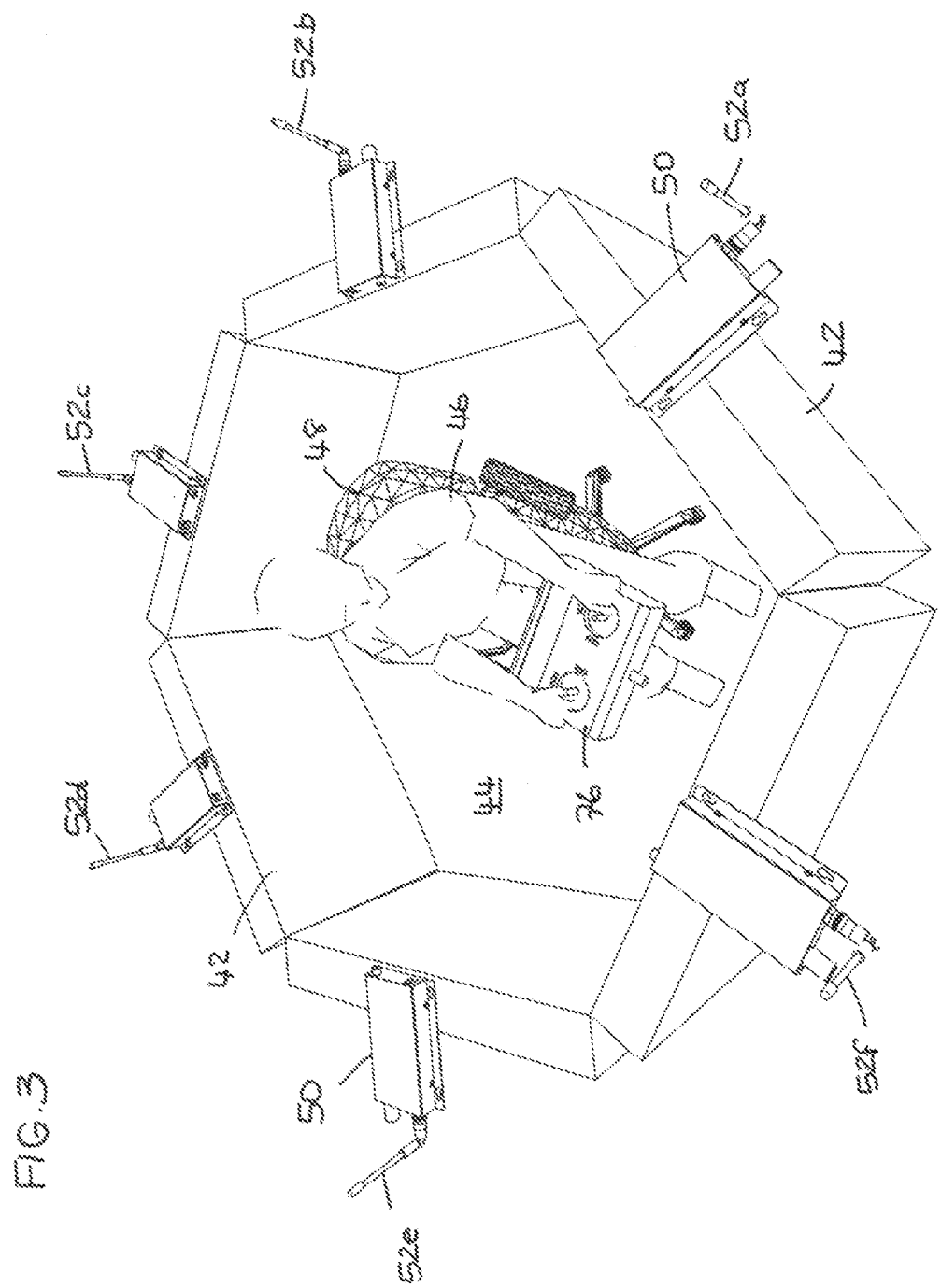
FIG. 3 is a top perspective view of a monitoring and display station in accordance with one aspect of the invention.

FIG. 3 of the drawings is a detail view of the monitoring station 40 of the invention, showing an operator 46 with control box 76 on a seat 48 placed in the space 44. The operator 46 is surrounded by the six hexagonally arranged bank of monitors 42, each monitor 42 having its dedicated receiver 50 with antenna 52. The seat 48 is on wheels or casters, offering the operator 46 mobility in moving about the space 44, with the ability to turn or rotate his position to view any one or more of the six monitors 42. The six monitors collectively provide a 360 degree panoramic view that would be available to a person sitting in the aerial vehicle 16.

Figure 5:
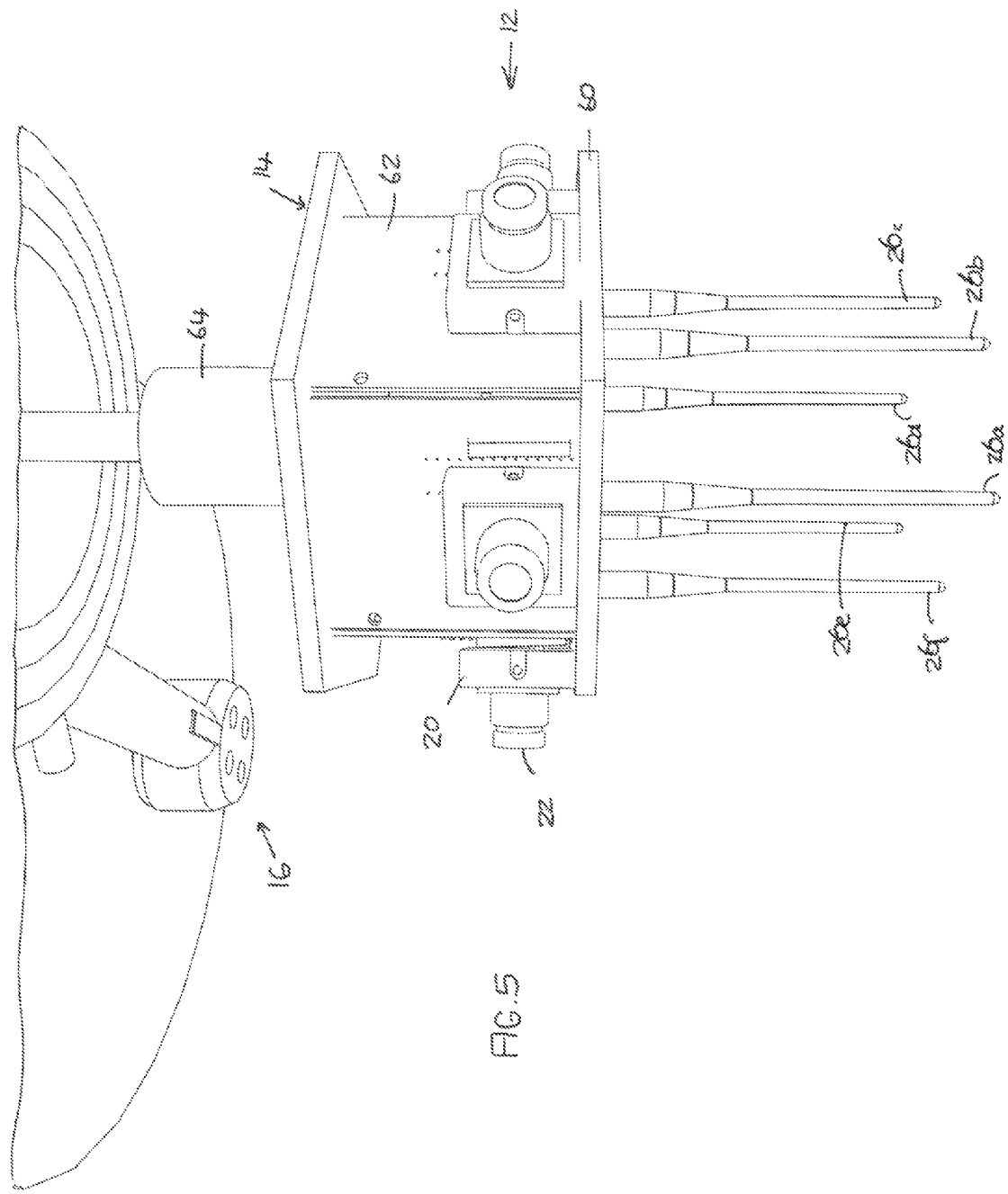
FIG. 5 is a detailed perspective view of a the image capture apparatus and antenna shown mounted on an aerial vehicle which is partially shown.

Each of the six antennae illustrated in FIG. 3 has been designated its own reference numeral, 52a, 52b, 52c, 52d, 52e and 52f. Each of these antennae 52a to 52f has its frequency communication setting and is programmed to receive data from one of the six corresponding antennae 26 on the camera array 12. As seen in FIG. 5 of the drawings, showing a more detailed view of the antennae 26 associated with the cameras or sensors 20, there are six antennae each having their own reference numerals, namely, 26a, 26b, 26c, 26d, 26e and 26f. Thus antenna 26a communicates with antenna 52a, antenna 26b communicates with antenna 52b, and so on. Each camera 20 therefore has the image it is capturing displayed on a dedicated monitor 42, all of the monitors 42 together providing the composite real time image of the surroundings as would be observed from the aerial vehicle 16. There is also the ability to move the aerial vehicle 16 in both direction and orientation to a selected location or position so that the image of the desired areas can be secured at the monitoring station 40.

Figure 4:
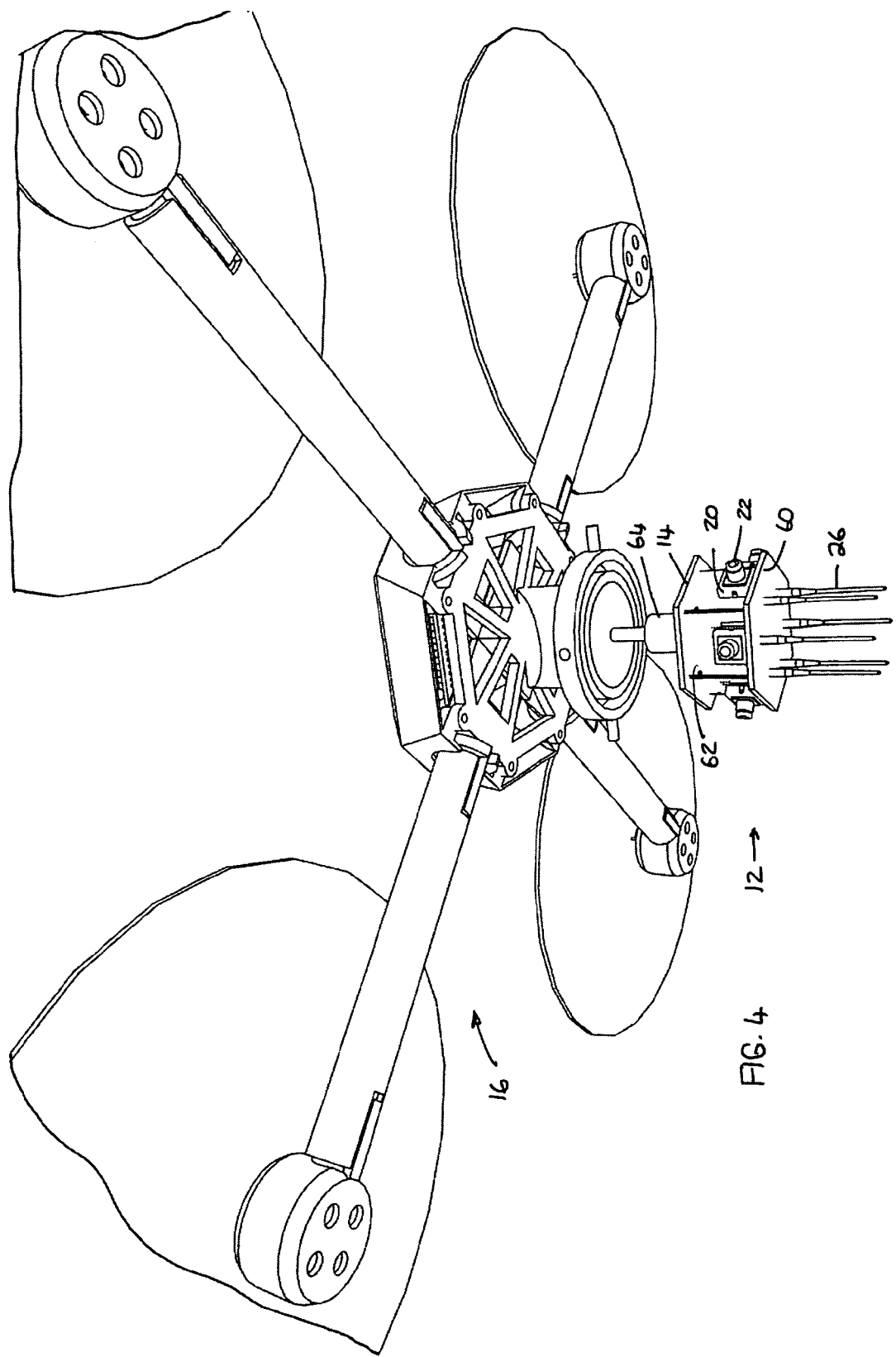
FIG. 4 is detail perspective view of the image capture apparatus mounted on an airborne vehicle in one aspect of the invention.

FIG. 4 of the drawings shows an upward perspective view of the aerial vehicle 16, the attachment fitting 64, frame 14 and cameras 20. This figure illustrates a situation where the system may be capturing images and transmitting them, as described above.

Figure 6:
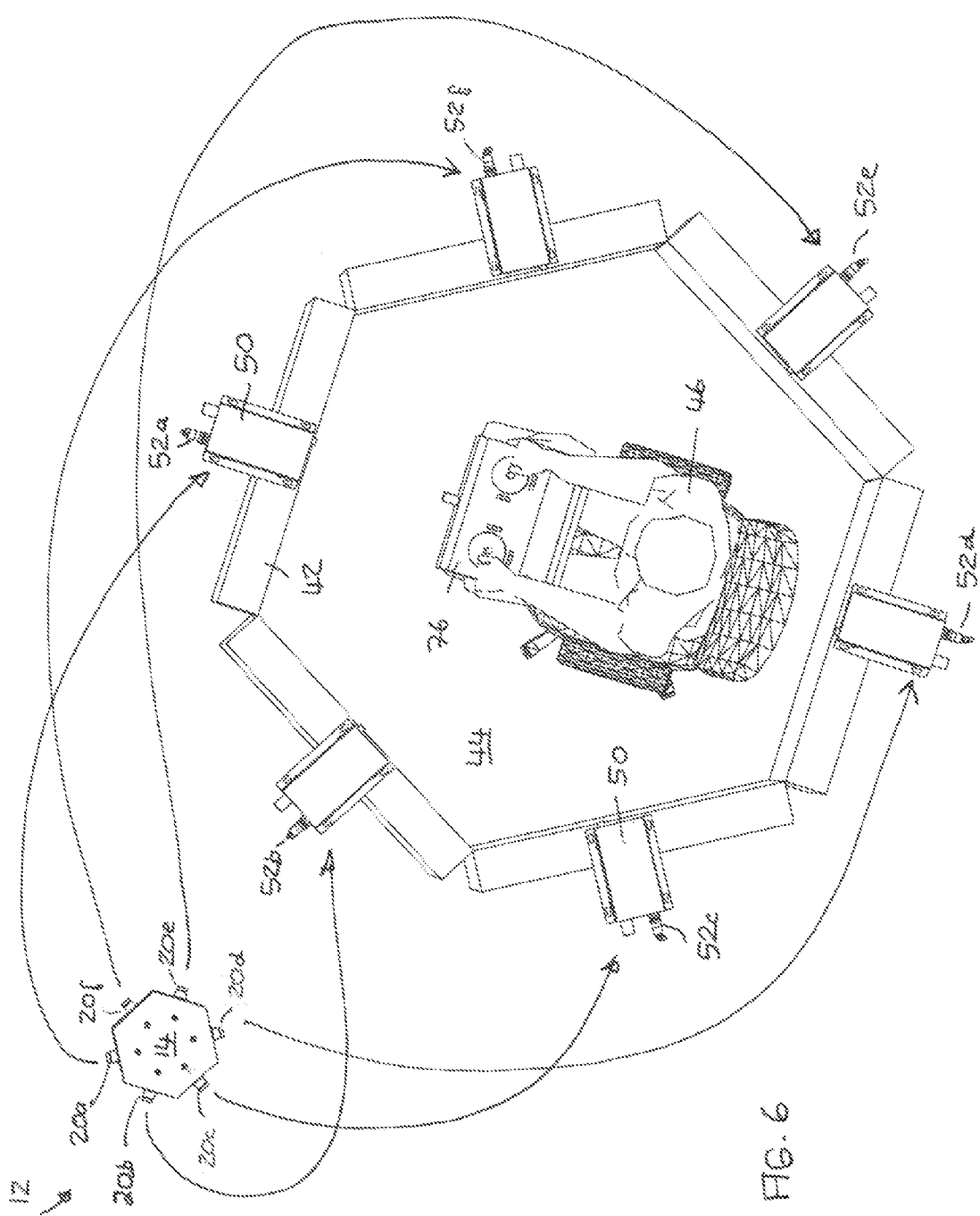
FIG. 6 is a top schematic view of a monitoring station and the image capture apparatus showing the respective transmitters and receivers associated with each other.

FIG. 6 of the drawings shows a schematic representation of the camera array 12, including cameras 20a, 20b, 20c, 20d, 20e and 20f, while attached to the aerial vehicle 16 (not shown) and its manner of communication with the monitoring station 40 as has already been described above. This figure illustrates the specific mechanism of communication between the two, with a transmitter 70 and antennae 26a, 26b, 26c, 26d, 26e and 26f on the aerial vehicle 16 communicating exclusively with its corresponding antenna 52 and receiver 50 on the monitoring station 40. As mentioned above, there are embodiments of the invention where two or more signals from separate transmitters 70 are combined or matrixed, transmitted through a common antenna, and then decoded at the monitoring station 40 and directed to the appropriate monitor 42 to reconstruct the composite image. In other words, it is not necessary to the invention that each camera 20 and monitor 42 have its own transmitter or receiver, so there may be fewer such transmitters or receivers than there are cameras 20.

While FIGS. 1 to 6 of the drawings show six cameras or monitors, the invention may have other desired numbers of these components. For example, there may be only four of each, or eight of each. Additionally, the cameras may not necessarily capture the entire 360 degree panoramic view. There may be two or more cameras for capturing images which represent only part of the full circumference, and the individual views need not be contiguous each other. There are many variations possible all of which are in the scope of this invention.

Figure 7:
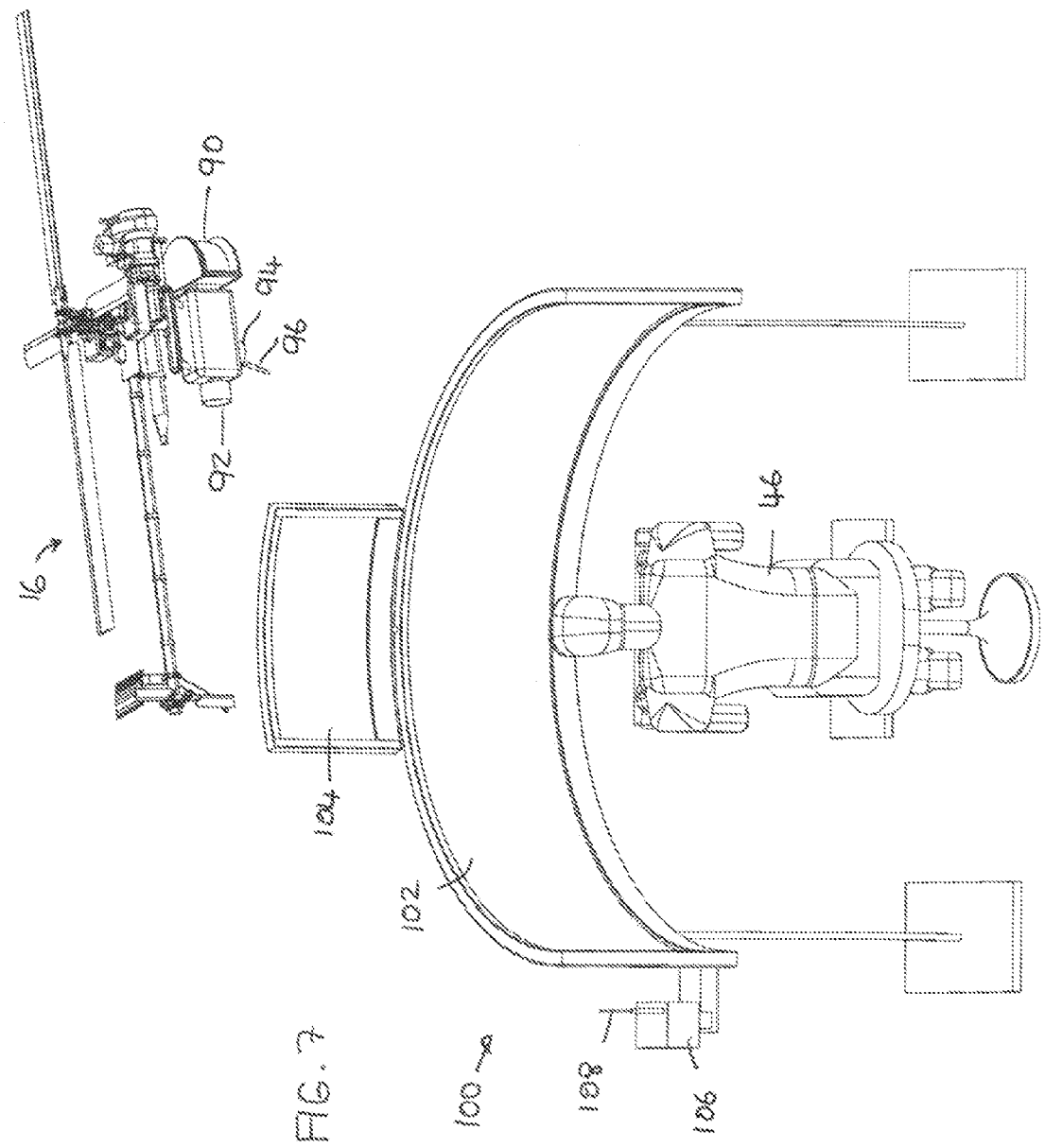
FIG. 7 is a schematic view of an aerial vehicle with cameras or sensors and a monitoring station with displays in accordance with a further embodiment of the invention.

FIG. 7 of the drawings shows another embodiment of the invention. The aerial vehicle 16 in this embodiment has two cameras, namely, a forward facing camera 90 which captures a 180 degree field of view, and rearward facing camera 92 having a 90 degree field of view. The cameras 90 and 92 therefore combine to provide a cumulative field of view of approximately 270 degrees. Each camera (or sensor, as the case may be) 90 and 92 may have its own transmitter and associated antenna, or there may be a single transmitter 94, as illustrated in FIG. 7 of the drawings, with its antenna 96 which transmits the combined signal from both cameras 90 and 92 to a receiver for display as will be described.

Note that the two cameras 90 and 92 may provide a field of view with different cumulative combinations to that illustrated, or even the full 360 degree view, based on the specific requirements and parameters of a given operation.

The monitoring station 100 is modified to suit the configuration of the cameras 90 and 92. The monitoring station 100 comprises a larger curved display 102 showing a 180 degree view corresponding to the image captured by the forward facing camera 90. The operator or pilot (or someone serving both of these functions) 46 sits in front of this display 102 as shown. A smaller curved display 104 is placed above the larger curved display 102, so that both the front view image from the aerial vehicle as well as the back view image can be observed simultaneously without having to physically shift positions within the space 44 referenced above. Precedence in terms of image size will be given to the forward view transmitted, but at the same time, the operator 46 will have within her peripheral vision at least the view to the rear of the aerial vehicle, as captured by the rearward facing camera 92.

The monitoring station 100 includes a receiver 106 with antenna 108 for communicating with and receiving data streams or signals from the transmitter 94. The number of receivers 106 on the monitor station 100 will correspond with the number of transmitters on the aerial vehicle 16 to facilitate proper presentation of the video stream accurately at the monitor station 100. Instead of multiple streams, there may be a combined matrix or single stream, as described with reference to a previous embodiment.

Note that combination of flat panel viewing and curved panel viewing may be provided. Thus, for example, a larger curved display 102 may be used in conjunction with one or more smaller flat panel displays of the type illustrated above, to present a view suitable to the circumstances of the operation.

Figure 8:
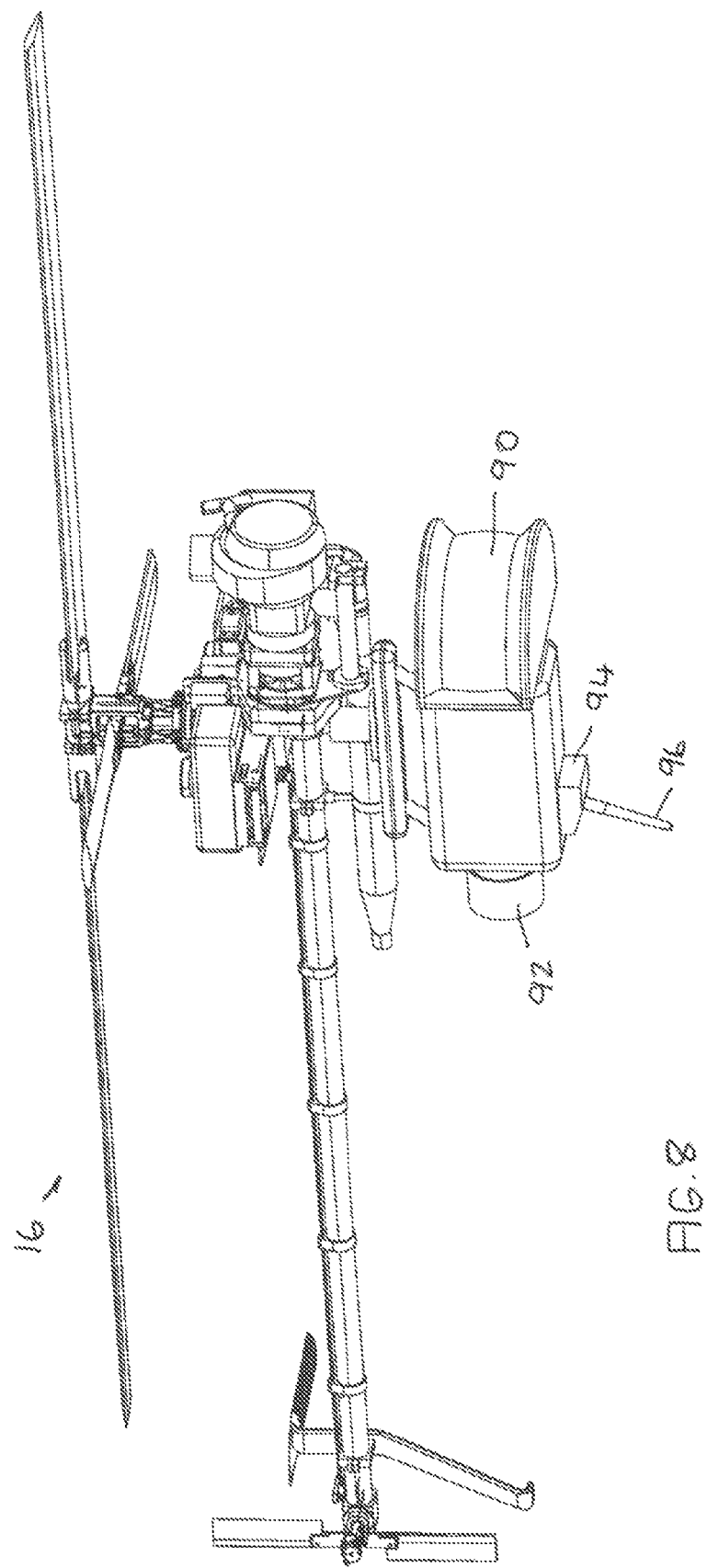
FIG. 8 is a detailed view of the aerial vehicle and its cameras or sensors of the type illustrated in FIG. 7 of the drawings.
Figure 9:
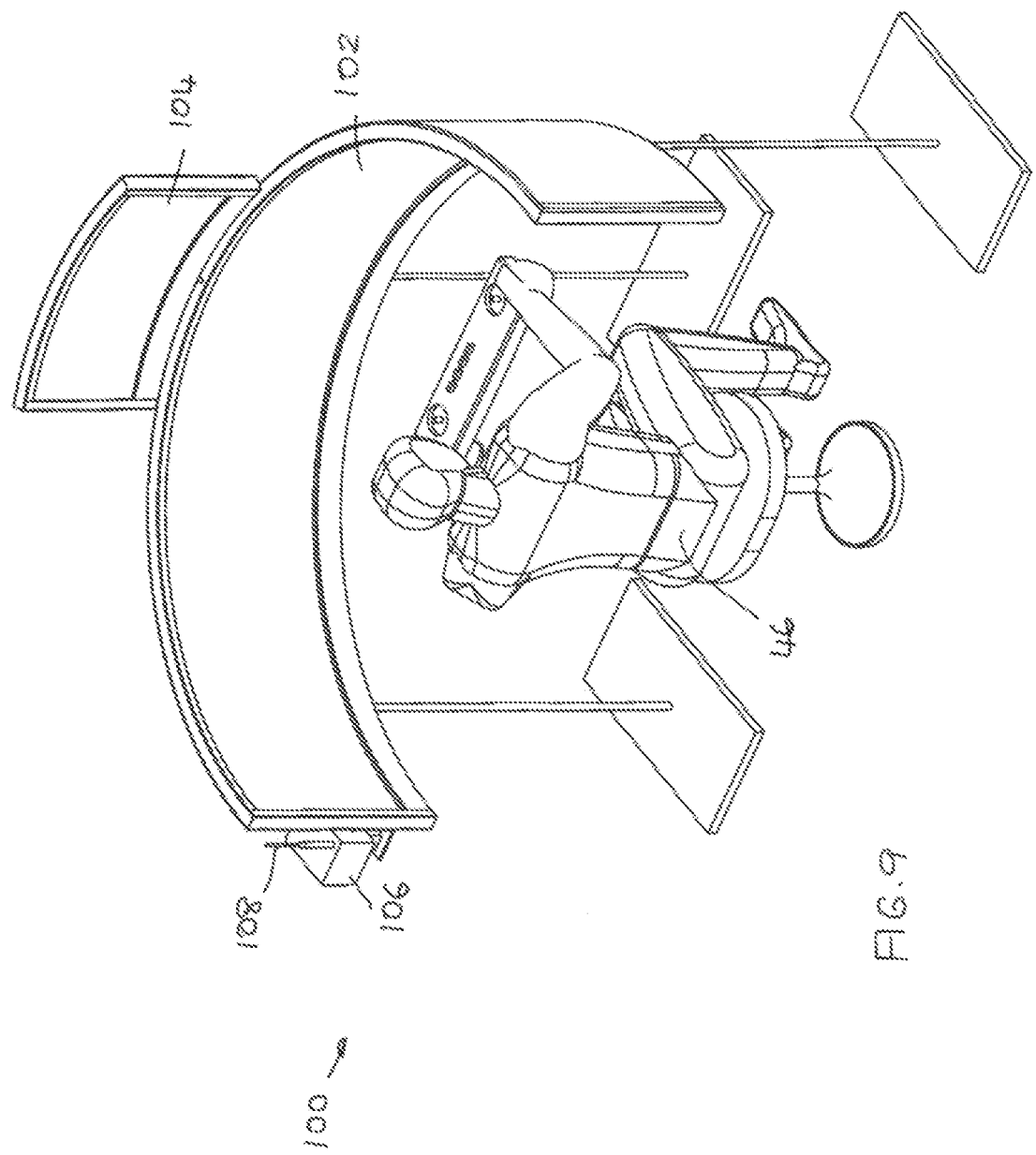
FIG. 9 is a detailed view of the monitoring station and its monitors or displays of the type illustrated in FIG. 7 of the drawings.

FIG. 8 shows a more detailed view of the aerial vehicle 16 as illustrated in FIG. 7 of the drawings, while FIG. 9 shows a more detailed perspective view of the monitor station 100, with a better view of the control panel used by the operator to mange and adjust the cameras as well as the direction of flight and orientation of the aerial vehicle.

Figure 10:
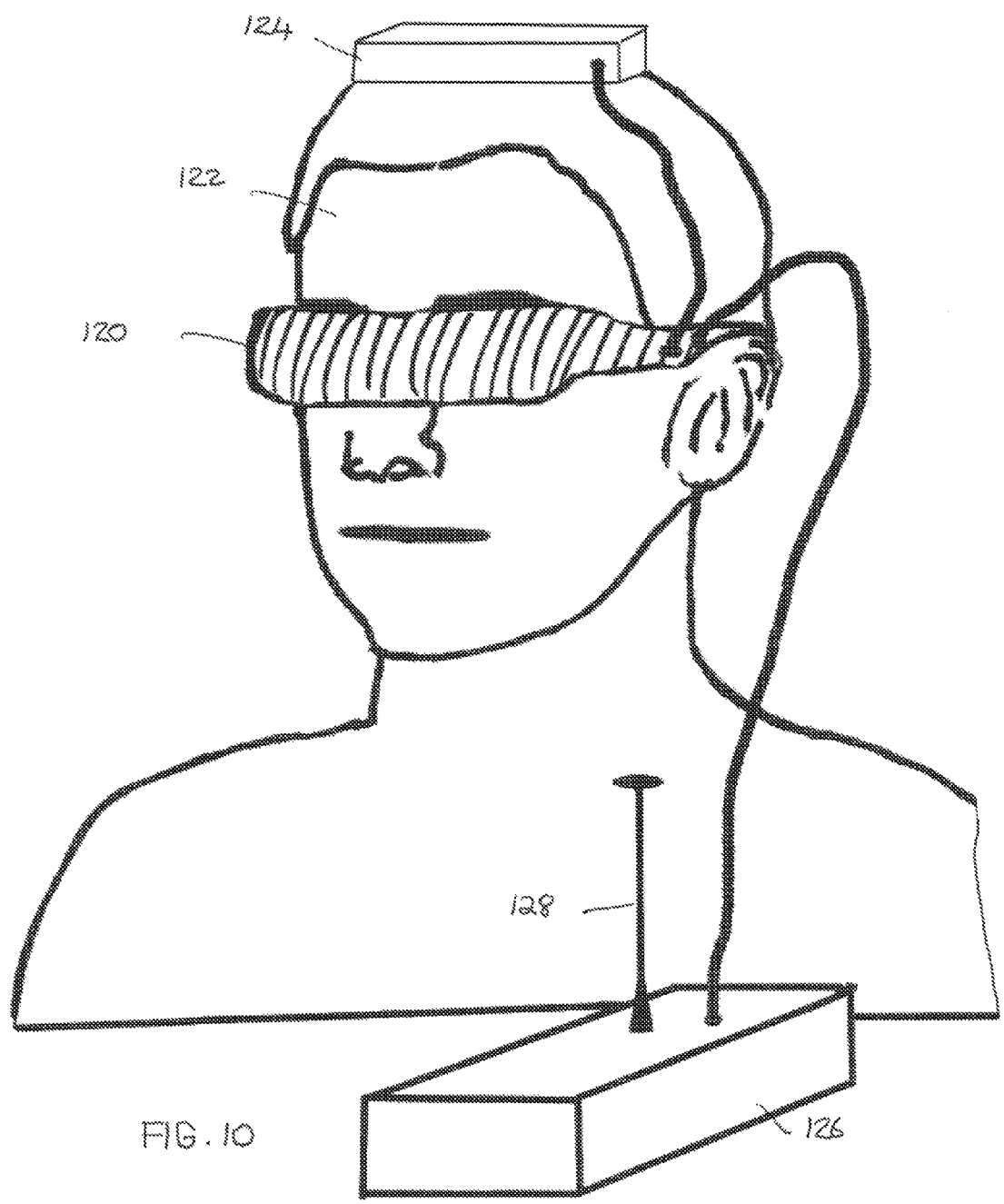
FIG. 10 shows a schematic view of goggles and related hardware worn by an operator for viewing the image captured on the aerial vehicle.

FIG. 10 is a schematic representation of video goggles 120 which may be worn by a user or operator 122 for viewing the signals transmitted from the cameras or sensors. In a preferred form of the invention, the goggles 120 may have sensors 124 for determining the position of the head of the operator 122 and displaying the image (such as a forward facing, rearward facing or side facing image) according to the sensed position of the head. There may also be associated with the goggles 120 a receiver 126 with antenna 128 which will have a purpose and function as already described.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A method for image capture with an unmanned aerial vehicle and remote display and control, comprising:

capturing a plurality of first video images in real-time using a video camera array system positioned on an unmanned aerial vehicle, wherein:

the video camera array system includes a plurality of first video cameras, each of the plurality of first video cameras has a separate first video signal, the plurality of first video cameras are arranged panoramically to capture for a remote pilot, and each of the separate first video signals is associated with a first antenna;

capturing a second video image in real-time using a video camera system positioned on the unmanned aerial vehicle, wherein:

the video camera system includes a second video camera, the second video camera has a second video signal, the second video signal is associated with a second antenna, and the first video camera array system is separate from the second video camera system;

separately transmitting the plurality of first video signals and the second video signal from the unmanned aerial vehicle;

remotely changing captured image orientation with respect to the unmanned aerial vehicle;

facilitating display of the plurality of first video signals using a monitor display array positioned remotely from the video camera array system, wherein:

the monitor display array including a plurality of display monitors, the plurality of display monitors matches the video camera array system to present panoramically to the pilot, the plurality of display monitors includes a display monitor, and the display monitor is associated with any one of the plurality of video cameras in the video camera array system or the video camera system.

2. The method of claim 1, wherein:
the plurality of video cameras in the video camera array system include cameras of a first type, and
the video camera system includes a camera of a second type.

3. The method of claim 1, wherein the video camera array system and the video camera system provide operational redundancy in the event that either fails.

4. The method of claim 1, wherein the monitor display array displays a composite real-time view of video streams captured by the video camera array system.

5. The method of claim 1, wherein the respective views from the plurality of first video cameras in the video camera array system are different from the view of the second video camera in the video camera system.

6. The method of claim 1, wherein the video pixel data comprising the views from the plurality of second video cameras in the video camera array system are combined into one composite video signal, transmitted using one transmitter, received by one coupled antenna, separated, and then displayed on two or more monitors in the monitor display array.

7. The method of claim 1, wherein one or more signals of the first plurality of video cameras of the video camera array system and/or the second video signal of the second video camera of the video camera system is transmitted as an analog video signal.

8. The method of claim 1, wherein the video camera system captures in the visual spectrum and the video camera array system captures in the infrared spectrum or in night vision.

9. The method of claim 1, wherein the video camera system captures in the infrared spectrum and the video camera array system captures in the visible spectrum.

10. The method of claim 1, wherein the plurality of first video cameras and the second video camera transmit their video signals using a plurality of carrier frequencies.

11. The method of claim 1, wherein:
the video signals of the respective plurality of second video cameras in the video camera array system are transmitted using the first antenna, and
the video signal of the second video camera in the video camera system is transmitted using the second antenna.

12. The method of claim 1, wherein the respective video cameras of the video camera array system and the video camera of the video camera system can be moved up or down with respect to orientation of the aerial vehicle.

13. The method of claim 1, wherein one or more of the plurality of first video cameras and the second video camera is actively stabilized.

14. An unmanned aerial vehicle, comprising:
one or more antennas;
a video camera array system positioned on the unmanned aerial vehicle, wherein:

the video camera array system is configured to capture a plurality of first video images in real-time, the video camera array system includes a plurality of first video cameras, each of the plurality of first video cameras has a separate first video signal, the plurality of first video cameras are arranged panoramically to capture for a remote pilot, and each of the separate first video signals is associated with a first antenna; and a video camera system positioned on the unmanned aerial vehicle, wherein:

the video camera system is configured to capture a second video image in real-time, the video camera system includes a second video camera, the second video camera has a second video signal, the second video signal is associated with a second antenna, the first video camera array system is separate from the second video camera system, the unmanned aerial vehicle is configured to separately transmit the plurality of first video signals and the second video signal, captured image orientation with respect to the unmanned aerial vehicle is remotely changed by the remote pilot, and the plurality of first video signals match a monitor display array positioned remotely from the unmanned aerial vehicle, whereby:

the plurality of display monitors matches the video camera array system to present panoramically to the remote pilot, the plurality of display monitors includes a display monitor, and the display monitor is associated with any one of the plurality of video cameras in the video camera array system or the video camera system.

15. The unmanned aerial vehicle of claim 14, wherein:
the plurality of first video cameras in the video camera array system include cameras of a first type, and
the video camera system include a camera of a second type.

16. The unmanned aerial vehicle of claim 14, wherein respective views from the plurality of first video cameras in the second video camera array system are different from a view of the video camera in the video camera system.

17. The unmanned aerial vehicle of claim 14, wherein the plurality of first video signals comprising views from two or more video cameras in the video camera array system are combined into one video signal, transmitted using one transmitter, received by one coupled antenna, separated, and then displayed on two or more monitors in the monitor display array.

18. The unmanned aerial vehicle of claim 14, wherein the respective video cameras of the video camera array system and the video camera of the video camera system can be moved up or down with respect to orientation of the aerial vehicle.

19. An image capture system, comprising:
an unmanned aerial vehicle, comprising
a first antenna;
a video camera array system positioned on the unmanned aerial vehicle, wherein:
the video camera array system is configured to capture a plurality of first video images in real-time,
the video camera array system includes a plurality of first video cameras, each of the plurality of first video cameras has a separate first video signal, the plurality of first video cameras are arranged panoramically to capture for a remote pilot, and each of the separate first video signals is associated with the first antenna; and a second antenna;

a video camera system positioned on the unmanned aerial vehicle, wherein:

the video camera system is configured to capture a second video image in real-time, the video camera system includes a second video camera, the second video camera has a second video signal, the second video signal is associated with the second antenna, the first video camera array system is separate from the second video camera system, the unmanned aerial vehicle is configured to separately transmit the plurality of first video signals and the second video signal, and captured image orientation with respect to the unmanned aerial vehicle is remotely changed by the remote pilot; and a monitor display array positioned remotely from the unmanned aerial vehicle, wherein:

the monitor display array includes a plurality of display monitors, the plurality of display monitors matches the video camera array system to present panoramically to the remote pilot, the plurality of display monitors includes a display monitor, and the display monitor is associated with any one of the plurality of video cameras in the video camera array system or the video camera system.

20. The image capture system of claim 19, wherein:

the plurality of first video cameras in the video camera array system include cameras of a first type, and the second video camera of the video camera system include a camera of a second type.

21. The image capture system of claim 19, wherein respective views from the plurality of first video cameras in the video camera array system are different from a view of the second video camera in the video camera system.

22. The image capture system of claim 19, wherein the plurality of first video signals comprising views from two or more video cameras in the video camera array system are combined into one video signal, transmitted using one transmitter, received by one coupled antenna, separated, and then displayed on two or more monitors in the monitor display array.

23. The image capture system of claim 19, wherein lenses of the respective video cameras of the video camera array system and the video camera of the video camera system can be moved up or down with respect to orientation of the aerial vehicle.

* * * * *